US008610939B2

(12) United States Patent
Enami

(10) Patent No.: US 8,610,939 B2
(45) Date of Patent: Dec. 17, 2013

(54) APPLICATION DELIVERING SYSTEM

(75) Inventor: Eiji Enami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 20 days.

(21) Appl. No.: 13/534,084

(22) Filed: Jun. 27, 2012

(65) Prior Publication Data

US 2013/0027743 A1 Jan. 31, 2013

(30) Foreign Application Priority Data

Jul. 26, 2011 (JP) .................................. 2011-163380

(51) Int. Cl.
*G06F 3/12* (2006.01)
*G06K 15/00* (2006.01)

(52) U.S. Cl.
USPC .......................... 358/1.15; 358/1.13; 358/1.16

(58) Field of Classification Search
None
See application file for complete search history.

(56) References Cited

U.S. PATENT DOCUMENTS

| 6,476,836 | B2 | 11/2002 | Enami |
| 2003/0058471 | A1 | 3/2003 | Okubo |
| 2008/0052710 | A1 | 2/2008 | Iwai et al. |

FOREIGN PATENT DOCUMENTS

| JP | 2002-207606 | 7/2002 |
| JP | 4321566 | 8/2009 |

*Primary Examiner* — Thierry L Pham
(74) *Attorney, Agent, or Firm* — IPUSA, PLLC

(57) ABSTRACT

An application delivering system includes an image forming apparatus that stores list information including plural sets of information, each including an item indicating a function capable of being provided by the image forming apparatus, and ID of an application program which is necessary to use the function in correspondence with the item indicating the function; an information terminal that determines whether it is necessary to obtain the application program to use a desired function of the image forming apparatus selected by a user among the functions indicated by the items included in the list information and sends a request for delivering the application program including ID of the application program to the application delivering server; and an application delivering server that stores application programs in correspondence with ID and delivers the application program identified by the ID included in the request to the information terminal.

7 Claims, 13 Drawing Sheets

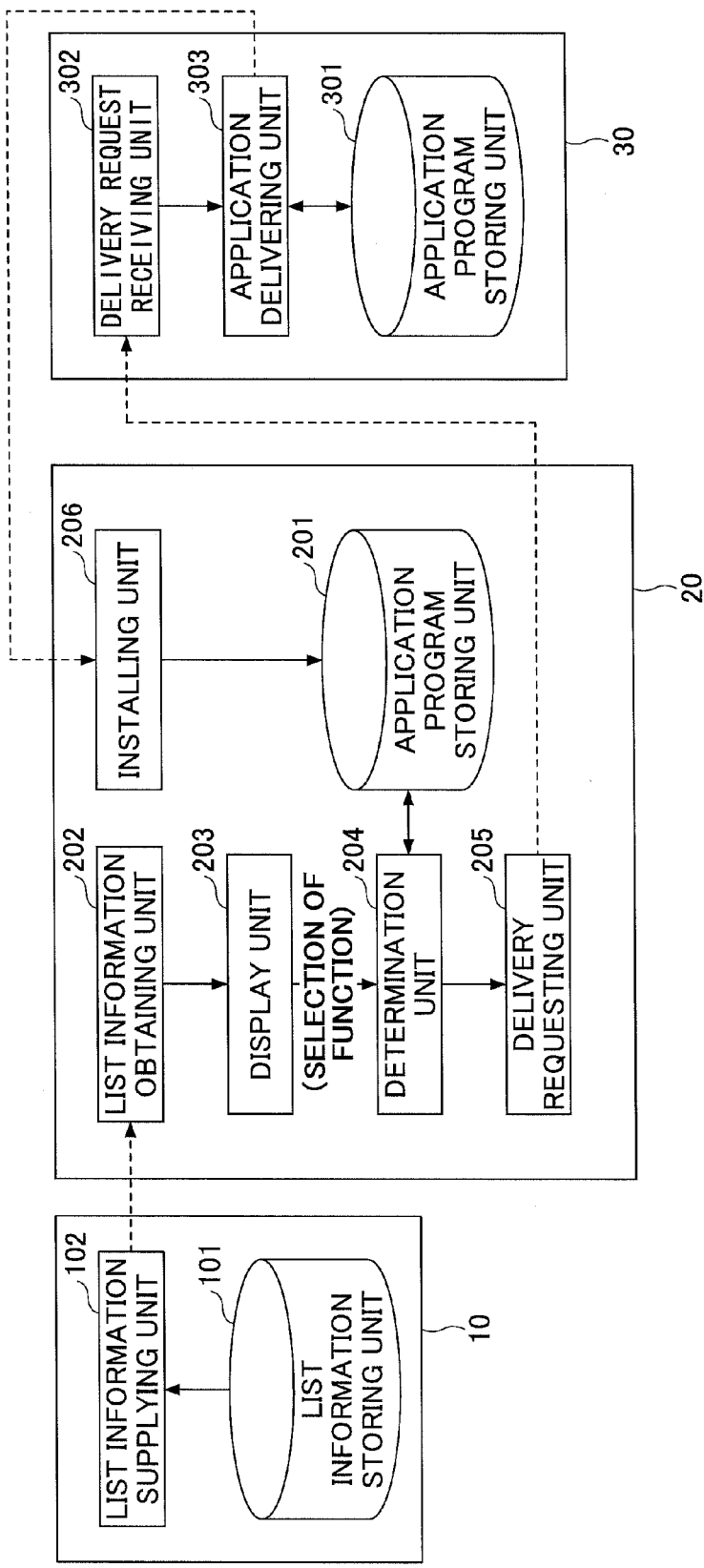

FIG.4

| NAME OF FUNCTION | EXPLANATION OF FUNCTION | NAME OF APPLICATION PROGRAM | ID | LATEST VERSION |
|---|---|---|---|---|
| SCAN TO CLOUD | FUNCTION TO AUTOMATICALLY STORE SCANNED DATA TO CLOUD SERVER | SCAN APP 001 | S001 | 1.00 |
| SCAN TO USB MEMORY | FUNCTION TO AUTOMATICALLY STORE SCANNED DATA TO USB MEMORY CONNECTED TO MFP | SCAN APP 002 | S002 | 1.00 |
| CLOUD PRINT | FUNCTION TO OBTAIN AND PRINT DATA STORED IN CLOUD SERVER | PRINT APP 001 | P001 | 1.00 |
| ASSISTANCE FUNCTION A | FUNCTION TO PRINT LIST OF CUSTOMER | CUSTOMIZE APP A | C001 | 1.02 |
| ASSISTANCE FUNCTION B | FUNCTION TO SEND FAX TO CUSTOMER ON LIST AND ... | CUSTOMIZE APP B | C002 | 2.00 |
| .. | .. | .. | .. | .. |

| NAME OF APPLICATION PROGRAM | ID | VERSION | KIND/VERSION OF OS | SIZE OF DISPLAY | PERFORMANCE | APPLICATION PROGRAM |
|---|---|---|---|---|---|---|
| SCAN APP 001 | S001 | 1.00 | xOS 1.x | STANDARD | STANDARD | ¥server/S001/app_1.00_xOS_1.x_s_s.exe |
|  | S001 | 1.00 | xOS 1.x | LARGE | HIGH | ¥server/S001/app_1.00_xOS_1.x_h.h.exe |
|  | S001 | 1.00 | xOS 2.x | STANDARD | STANDARD | ¥server/S001/app_1.00_xOS_2.x_s_s.exe |
|  | S001 | 1.00 | xOS 2.x | LARGE | HIGH | ¥server/S001/app_1.00_xOS_2.x_h_h.exe |
|  | S001 | 1.00 | yOS 4.x | STANDARD | STANDARD | ¥server/S001/app_1.00_yOS_4.x_s_s.exe |
|  | S001 | 1.00 | yOS 4.x | LARGE | HIGH | ¥server/S001/app_1.00_yOS_4.x_h_h.exe |
| SCAN APP 002 | S002 | 1.00 | xOS 1.x |  |  | ¥server/S002/app_1.00_xOS_1.x.exe |
|  | S002 | 1.00 | xOS 2.x |  |  | ¥server/S002/app_1.00_xOS_2.x.exe |
|  | S002 | 1.00 | yOS 4.x |  |  | ¥server/S002/app_1.00_yOS_4.x.exe |
| PRINT APP 001 | P001 | 1.00 | xOS 2.x |  |  | ¥server/P002/app_1.00_xOS_2.x.exe |
|  | P001 | 1.00 | yOS 4.x |  |  | ¥server/P002/app_1.00_yOS_4.x.exe |
| CUSTOMIZE APP A | C001 | 1.00 | xOS 1.x |  |  | ¥server/C001/app_1.00_xOS_1.x.exe |
|  | C001 | 1.00 | xOS 2.x | STANDARD | STANDARD | ¥server/C001/app_1.00_xOS_2.x_s_s.exe |
|  | C001 | 1.00 | xOS 2.x | LARGE | HIGH | ¥server/C001/app_1.00_xOS_2.x_h_h.exe |
|  | C001 | 1.02 | xOS 2.x | STANDARD | STANDARD | ¥server/C001/app_1.02_xOS_2.x_s_s.exe |
|  | C001 | 1.02 | xOS 2.x | LARGE | HIGH | ¥server/C001/app_1.02_xOS_2.x_h_h.exe |
| CUSTOMIZE APP B | C002 | 1.02 | xOS 1.x |  |  | ¥server/C002/app_1.02_xOS_1.x.exe |
|  | C002 | 1.02 | xOS 2.x | STANDARD | STANDARD | ¥server/C002/app_1.02_xOS_2.x_s_s.exe |
|  | C002 | 1.02 | xOS 2.x | LARGE | HIGH | ¥server/C002/app_1.02_xOS_2.x_h_h.exe |
|  | C002 | 2.00 | xOS 1.x | STANDARD | STANDARD | ¥server/C002/app_2.00_xOS_1.x_s_s.exe |
|  | C002 | 2.00 | xOS 1.x | LARGE | HIGH | ¥server/C002/app_2.00_xOS_1.x_h_h.exe |
|  | C002 | 2.00 | xOS 2.x | STANDARD | STANDARD | ¥server/C002/app_2.00_xOS_2.x_s_s.exe |
|  | C002 | 2.00 | xOS 2.x | LARGE | HIGH | ¥server/C002/app_2.00_xOS_2.x_h_h.exe |
| ... | ... | ... | ... | ... | ... | ... |

FIG.11

MFP10-1:3F CENTER OF OFFICE
USABLE FUNCTIONS

PLEASE TOUCH THE NAME OF THE FUNCTION.

| NAME OF FUNCTION | EXPLANATION OF FUNCTION |
|---|---|
| SCAN TO CLOUD | FUNCTION TO AUTOMATICALLY STORE SCANNED DATA TO CLOUD SERVER |
| SCAN TO USB MEMORY | FUNCTION TO AUTOMATICALLY STORE SCANNED DATA TO USB MEMORY CONNECTED TO MFP |
| CLOUD PRINT | FUNCTION TO OBTAIN AND PRINT DATA STORED IN CLOUD SERVER |
| ASSISTANCE FUNCTION A | FUNCTION TO PRINT LIST OF CUSTOMER |
| ASSISTANCE FUNCTION B | FUNCTION TO SEND FAX TO CUSTOMER ON LIST AND ⋯ |

→NEXT

APPLICATION DELIVERING SYSTEM

BACKGROUND OF THE INVENTION

1. Field of the Invention

The present invention relates to an application delivering system.

2. Description of the Related Art

Conventionally, an image forming apparatus such as a Multi-Function Peripheral (MFP) is known, in which plural functions such as copying, scanning, printing, faxing and the like are installed in a single body. Such an image forming apparatus, which will be referred to as the MFP hereinafter, provides plural modifications or functions for a user in addition to a function as a digital copying machine such as a function of sending and receiving images or documents via a network or a facsimile transmission in accordance with progress of the technology related to the MFP such as improvements in CPU performance, in mass storage, in high-speed communications, in digital image technology, and the like.

Generally, the MFP includes an operation panel with which a user operates the MFP by touching the operation panel or the like. Meanwhile, a portable information terminal such as a multi-functional mobile phone, a tablet device or the like has been widely developed. In accordance with this development, there is a desire to operate the MFP by using the portable information terminal instead of the operation panel via a wireless communication function of the portable information terminal.

In order to operate the MFP (or other devices for offices) by the portable information terminal, it is necessary to install a browser application program or other application programs in the portable information terminal as well as to configure the MFP to have a Web server function or install an application program interface (API) for the Web. Here, even when the portable information terminal is connected to the MFP by wireless communication, if the portable information terminal does not include an application program (software) capable of using functions of the MFP, it is impossible to use the functions of the MFP. Thus, it is necessary to previously install application programs necessary for using the functions of the MFP in the portable information terminal.

If a full version of an application program which is capable of using all of the functions of the MFP is installed in the portable information terminal, it is possible for the portable information terminal to use all of the functions of the MFP. However, it may cause overload for the portable information terminal, which is relatively small in size, to install such a full version of the application program. Further, it may be a rare case to use all of the functions of the MFP.

On the other hand, if application programs capable of using functions of the MFP are not installed in the portable information terminal at all, it is necessary for the portable information terminal to obtain a necessary application program capable of using a desired function of the MFP and install it after being connected to the MFP by wireless communication. However, in this case, as it is necessary to select a suitable application program capable of using the desired function, it may be troublesome for the user.

Regarding the above technique, Patent Document 1, for example, discloses an image processing system including an image processing apparatus and a portable terminal. In this system, an application program for each job is sent from the image forming apparatus to the portable terminal and by using the application program, the portable terminal operates the image forming apparatus for changing content of the job, for example. With this, for example, when the portable terminal receives an error notice from the image forming apparatus, the portable terminal obtains and installs an application program for operating the image forming apparatus to remove the error so that the user can operate the image forming apparatus to remove the error by connecting the portable terminal to the image forming apparatus by wireless communication without moving to be in front of the image forming apparatus.

However, if the image forming apparatus (MFP) is to send the application program to the portable terminal as disclosed in Patent Document 1, it is necessary for the MFP to store all of the application programs for portable terminals. As described above, recently, the MFP has come to have plural modifications or functions. Thus, plural kinds of application programs are necessary to use the functions of the MFP. Thus, if such a large number of application programs are stored in the MFP, it may cause an increase in cost of a storage device of the MFP or the capacity of the storage device available for storing documents or the like may be reduced.

PATENT DOCUMENT

[Patent Document 1] Japanese Patent No. 4,321,566

SUMMARY OF THE INVENTION

The present invention is made in light of the above problems, and provides an application delivering system capable of delivering to a portable information terminal an application program necessary for using a function of an image forming apparatus desired by a user with a simple operation while reducing use of storage resources of the image forming apparatus.

According to an embodiment, there is provided an application delivering system including an image forming apparatus; an information terminal configured to operate the image forming apparatus; and an application delivering server configured to deliver an application program for operating the image forming apparatus to the information terminal, the information terminal being capable of connecting to the image forming apparatus and the application delivering server via a network. The image forming apparatus includes a list information storing unit that stores list information including plural sets of information, each of the sets of information including an item indicating a function capable of being provided by the image forming apparatus, and identification data of the application program which is necessary for the information terminal to use the function in correspondence with the item indicating the function, and a list information supplying unit that supplies the list information to the information terminal. The information terminal includes a list information obtaining unit that obtains the list information from the image forming apparatus, a determination unit that determines whether it is necessary to obtain the application program necessary for the information terminal to use the function of the image forming apparatus selected by a user among the functions indicated by the items included in the list information, and a delivery requesting unit that sends a request for delivering the application program including identification data of the application program to the application delivering server when the determination unit determines it is necessary to obtain the application program. The application delivering server includes an application program storing unit that stores application programs in correspondence with identification data, a delivery request receiving unit that receives the request for delivering the application program from the information terminal, and an application program delivering unit that delivers the application program identified by the identification data included in the request for delivering the application program, to the information terminal.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 3 is a block diagram showing an example of functional components of a MFP, a portable information terminal and an application delivering server of an embodiment;

FIG. 4 is a view showing an example of an application function list;

FIG. 5 is a view showing an example of an application program list;

FIG. 11 is a view showing an example of an image displayed on a display panel of the portable information terminal;

DETAILED DESCRIPTION OF THE PREFERRED EMBODIMENTS

Figure 1:
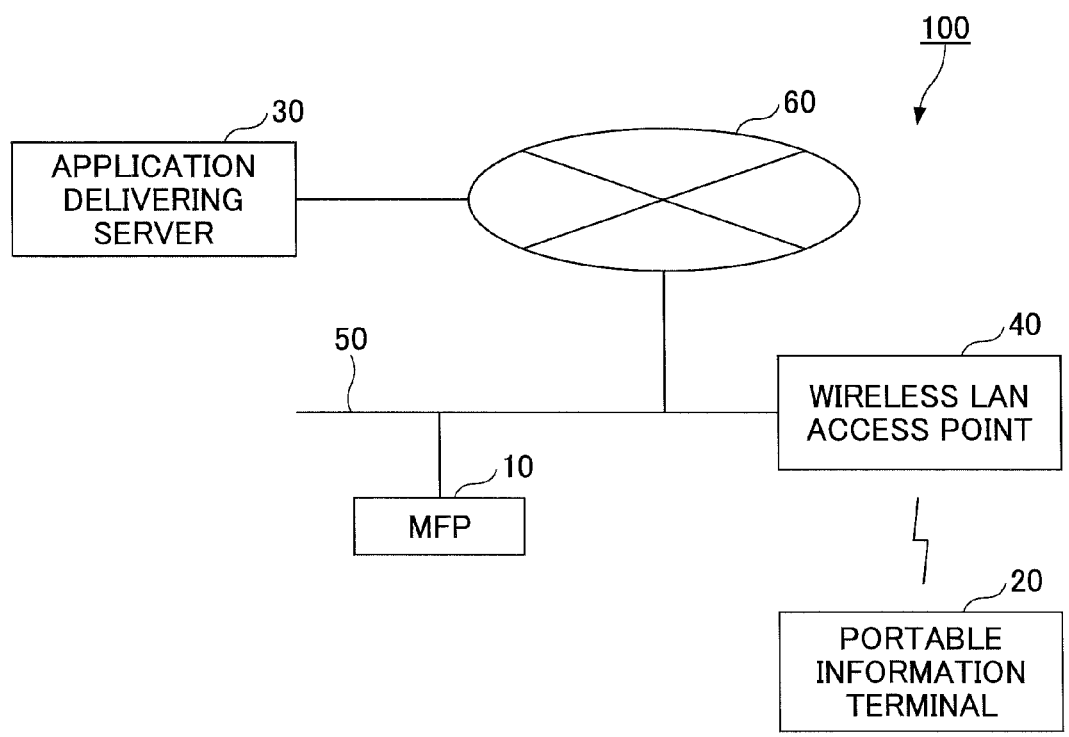
FIG. 1 is a block diagram showing an example of a network structure of an application delivering system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

An application delivering system of the embodiment includes an image forming apparatus such as a Multi-Function Peripheral (MFP), a portable information terminal, and an application delivering server. When the portable information terminal is connected to the image forming apparatus (which will be referred to as a MFP hereinafter), the MFP sends list information to the portable information terminal. The list information includes plural sets of information, each including an item indicating a function (a name of a function, for example) capable of being provided by the MFP, and identification data (which will be referred to as ID hereinafter) of an application program necessary for the portable information terminal to use the function in correspondence with the item indicating the function. When a user of the portable information terminal selects one of the sets of information included in the list information, the selected set of information is sent to the application delivering server. Then, the application delivering server delivers an application capable of using the desired function indicated by the selected set of information to the portable information terminal. Then, by installing the delivered application in the portable information terminal, the portable information terminal can use the desired function of the MFP by connecting to the MFP again by wireless communication or the like. This operation is explained in detail in the following.

System Structure (Network Structure)

FIG. 1 is a block diagram showing an example of a network structure of an application delivering system 100 of the embodiment. The application delivering system 100 includes a MFP 10, a portable information terminal 20, an application delivering server 30 and a wireless local area network (LAN) access point 40 which are connected with each other via networks such as a LAN 50, a wide area network (WAN) 60 and the like.

The MFP 10 may be an example of an image forming apparatus in which plural functions such as copying, scanning, printing, faxing and the like are installed in a single body. The application delivering system 100 may include plural of the MFPs 10 to be connected to the LAN 50, which may be referred to as a MFP 10-1, a MFP 10-2 or the like as will be explained later. The portable information terminal 20 may be a portable device such as a multi-functional mobile phone, a tablet device, a personal digital assistant (PDA), a notebook computer or the like. The portable information terminal 20 is capable of connecting to the MFP 10 and the application delivering server 30 via a network including the LAN 50, the WAN 60 and the like by wirelessly connecting to the wireless LAN access point 40.

The application delivering server 30 is connected to the WAN 60, which may be the INTERNET, for example. The LAN 50 and the WAN 60 are connected with each other and terminals or devices connected to one of the LAN 50 and the WAN 60 are capable of communicating with terminals or devices connected to the other of the LAN 50 and the WAN 60.

The portable information terminal 20 may establish a wireless LAN communication using wireless LAN standard for a PC or the like such as wireless fidelity (Wi-Fi). Alternatively, the portable information terminal 20 may establish communication via a mobile phone, for example.

(Hardware Structure)

Figure 2:
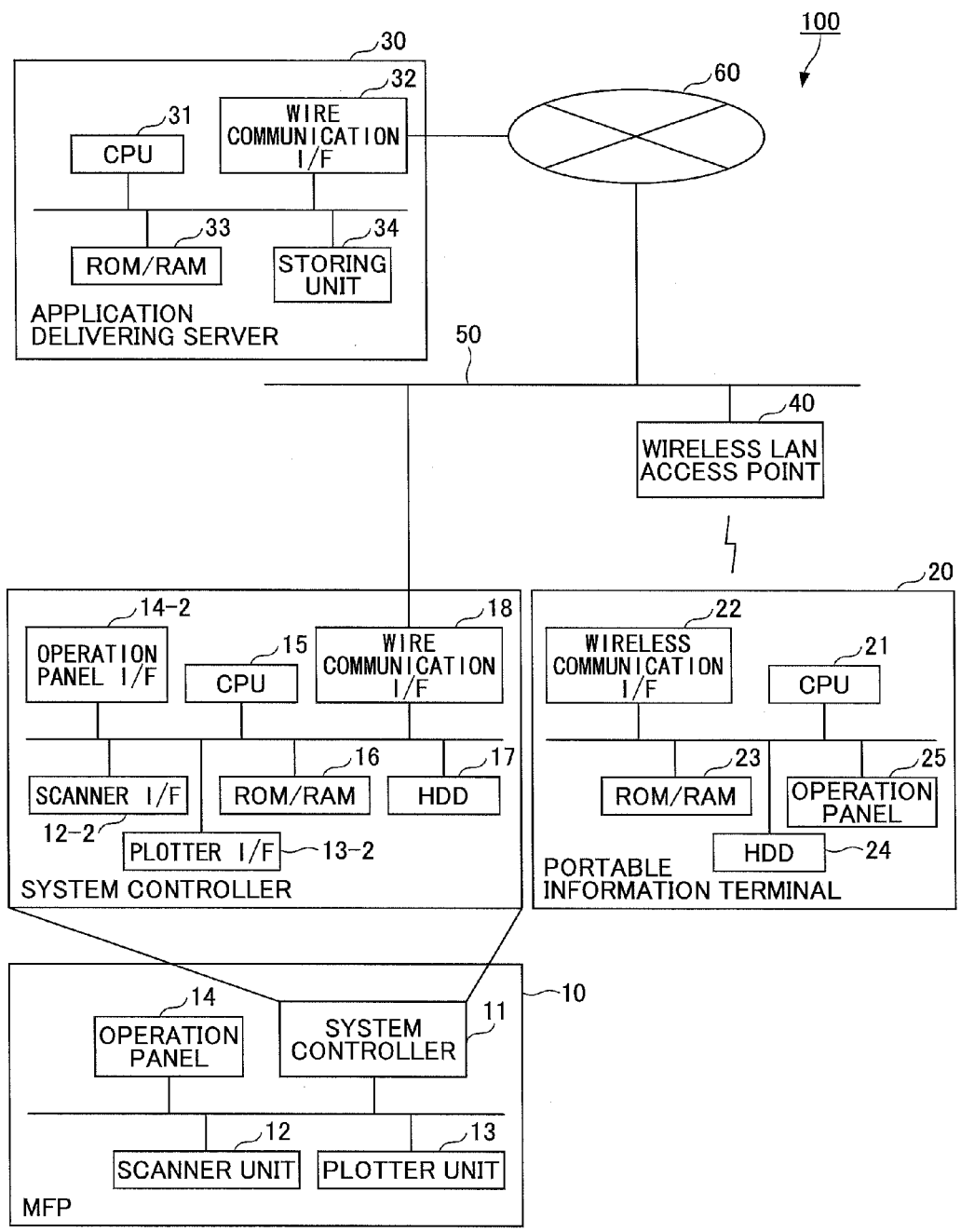
FIG. 2 is a block diagram showing an example of a hardware structure of the application delivering system of an embodiment.

An example of a hardware structure of the application delivering system 100 is explained. FIG. 2 is a block diagram showing an example of a hardware structure of the application delivering system 100.

The MFP 10 includes a system controller 11, a scanner unit 12, a plotter unit 13 and an operation panel 14. The system controller 11 controls the entirety of the MFP 10. The scanner unit 12 functions to read an image of a document and forms data of the image of the document. The plotter unit 13 prints data on a medium such as a paper or the like. The operation panel 14 receives an operational instruction and displays information.

Further, the system controller 11 of the MFP 10 includes a CPU 15 that manages and controls internal information of the MFP 10, a ROM/RAM 16 that stores a CPU control program for the system controller 11 and work data, a HDD 17 that stores the CPU control program for the system controller 11 and image data, a wire communication interface (I/F) 18 for connecting to the LAN 50, a scanner interface (I/F) 12-2 for the scanner unit 12, a plotter interface (I/F) 13-2 for the plotter unit 13, and an operation panel interface (I/F) 14-2 for the operation panel 14.

The portable information terminal 20 includes a CPU 21, a wireless communication interface (I/F) 22 for connecting to the wireless LAN access point 40, a ROM/RAM 23 that stores a CPU control program and work data, a HDD 24 that stores application programs for performing functions of the MFP 10 or the like, and an operation panel 25 that receives an operational instruction and displays information. The CPU 21 manages and controls internal information of the portable information terminal 20 and executes the application programs.

The application delivering server 30 includes a CPU 31, a wire communication interface (I/F) 32 for connecting to the WAN 60, a ROM/RAM 33 that stores a CPU control program and work data and a storing unit 34 that stores the application programs to be delivered to the portable information terminal 20. The CPU 31 controls receiving of a request for delivering an application program and delivering of an application program (software).

The wireless LAN access point 40 includes a wireless communication I/F and a wire communication I/F (not shown in the drawings), and mediates wireless and wire communications in the LAN 50 by performing a protocol conversion.

(Functional Structure)

The main functional structure of the MFP 10, the portable information terminal 20 and the application delivering server 30 of the embodiment is explained. FIG. 3 is a block diagram showing an example of functional components of the MFP 10, the portable information terminal 20 and the application delivering server 30 of the embodiment.

(MFP 10)

The MFP 10 includes a list information storing unit 101 and a list information supplying unit 102 as main functional components.

The list information storing unit 101 previously stores list information (which will be referred to as application function list, later) including plural sets of information, each including an item indicating a function (name of a function, for example) capable of being provided by the MFP 10, and ID of an application program which is necessary for an information terminal such as the portable information terminal 20 to use the function in correspondence with the item indicating the function. The list information storing unit 101 may be actualized by the HDD 17 or the like.

The list information supplying unit 102 sends the list information to the portable information terminal 20.

As the MFP 10 is the image forming apparatus in this embodiment, the MFP 10 includes functional components for forming images or the like as well although not shown in the drawings.

(Portable Information Terminal 20)

The portable information terminal 20 includes an application program storing unit 201, a list information obtaining unit 202, a display unit 203, a determination unit 204, a delivery requesting unit 205 and an installing unit 206 as main functional components.

The application program storing unit 201 stores application programs or the like which are installed in the portable information terminal 20. The application program storing unit 201 may be actualized by the HDD 24 or the like, for example. In this embodiment, in order for a user of the portable information terminal 20 to use a desired function of the MFP 10 by operating the portable information terminal 20, it is necessary to install an application program corresponding to the desired function in the portable information terminal 20.

The list information obtaining unit 202 obtains the list information from the MFP 10.

The display unit 203 displays the list information obtained by the list information obtaining unit 202. The display unit 203 displays the list information on the operation panel 25 or the like. With this operation, the user of the portable information terminal 20 can visually recognize a list of the names of the functions which are capable of being provided by the MFP 10, for example.

When a desired function is selected by the user of the portable information terminal 20 from the list information displayed by the display unit 203, the determination unit 204 determines whether the application program specified by the ID in correspondence with the name of the function, for example, selected by the user is already stored in the application program storing unit 201 of the portable information terminal 20.

When the determination unit 204 determines that the application program specified by the ID in correspondence with the name of the function selected by the user is not stored in the application program storing unit 201, the delivery requesting unit 205 sends a request for delivering the application program to the application delivering server 30. The request includes the ID of the application program and device information (kind of OS, version of OS, size of display, performance or the like) of the portable information terminal 20. As the application program is necessary for the portable information terminal 20 to use the function selected by the user, the portable information terminal 20 is configured to send the request for delivering the application program when the application program is not yet stored in the application program storing unit 201 of the portable information terminal 20.

When the application delivering server 30 delivers the application program in response to the request from the portable information terminal 20, the installing unit 206 installs the application program delivered by the application delivering server 30 in the application program storing unit 201 in correspondence with the ID of the application program.

(Application Delivering Server 30)

The application delivering server 30 includes an application program storing unit 301, a delivery request receiving unit 302 and an application delivering unit 303 as main functional components.

The application program storing unit 301 previously stores application programs to be delivered to the portable information terminal 20. The application program storing unit 301 may be actualized by the storing unit 34 or the like. The application programs to be delivered to the portable information terminal 20 may include plural application programs for each of the functions provided by the MFP 10, and plural versions of application programs for each of the application programs. The application program storing unit 301 further stores an application program list, which will be explained later.

The delivery request receiving unit 302 receives the request for delivering the application program from the portable information terminal 20. Upon receiving the request, the application delivering unit 303 delivers the corresponding application program to the portable information terminal 20.

The application delivering unit 303 delivers the application program of a version applicable to the portable information terminal 20 in response to the request for delivering the application program from the portable information terminal 20. Specifically, the application delivering unit 303 delivers the application program of a version applicable to the portable information terminal 20 based on the ID of the application program and the device information (kind of OS, version of OS, size of display, performance or the like) of the portable information terminal 20 by referring to the application program list, which will be explained later.

The above functions are actualized by programs executed by the CPUs of the MFP 10, the portable information terminal 20 and the application delivering server 30.

(Application Function List)

FIG. 4 is a view showing an example of an application function list stored in the list information storing unit 101 of the MFP 10. As explained above, the application function list is the list information including plural sets of information, each including the item indicating a function (name of a function, for example) capable of being provided by the MFP 10, and the ID of the application program which is necessary for the information terminal such as the portable information terminal 20 to use the function in correspondence with the item indicating the function.

Specifically, the application function list includes information items such as "name of a function", "explanation of a function", "name of an application program", "ID", "latest version of an application program" and the like, for each of the functions that are capable of being provided by the MFP 10.

The information item "name of a function" indicates a name of a function which is capable of being provided by the MFP 10. For example, the MFP 10 is configured to provide a function whose name is "scan to cloud".

The information item "explanation of a function" indicates an explanation of the function in correspondence with the name of the function which is capable of being provided by the MFP 10. For example, the explanation of the function whose name is "scan to cloud" is "a function to automatically store scanned data in a cloud server". In this embodiment, the explanations of the functions are displayed on a display panel of the portable information terminal 20 with the names of the functions so that the user of the portable information terminal 20 can recognize the content of the functions.

The information item "name of an application program" indicates a name of the application program necessary for the portable information terminal 20 to use the function which is capable of being provided by the MFP 10 in correspondence with the name of the function. For example, the name of the application program necessary for using the function whose name is "scan to cloud" is "scan app 001". It means that it is necessary for the portable information terminal 20 to store the application program whose name is "scan app 001" to perform the function of the MFP 10 whose name is "scan to cloud".

The information item "ID" indicates the ID of the application program that specifies or identifies the application program in correspondence with the name of the function and the name of the application program. The IDs are uniquely allocated to the names of the application programs so that overlap of the IDs does not occur.

The information item "latest version" indicates the latest version (version No.) of the name (or ID) of the application program. For example, the latest version of the application program whose name is "scan app 001" is "1.00".

As described above, the application function list is previously stored in the list information storing unit 101 of the MFP 10. The application function list may be previously stored in the list information storing unit 101 of the MFP 10 when the MFP 10 is shipped from a manufacturer or the like. Further, the application function list may be updated after the MFP 10 is introduced in accordance with adding of new application programs or new versions of the previously stored application programs.

(Application Program List)

FIG. 5 is a view showing an example of an application program list stored in the application program storing unit 301 of the application delivering server 30. As described above, the application delivering unit 303 specifies an application program to be delivered to the portable information terminal 20 based on the ID of the application program and the device information (kind of Operating System (OS), version of OS, size of display, performance or the like) of the portable information terminal 20 sent from the portable information terminal 20, and the application program list. Then, the application delivering unit 303 delivers the specified application program to the portable information terminal 20.

Specifically, the application program list includes information items such as "name of an application program", "ID", "version", "kind/version of OS", "size of display", "performance", "application program" and the like, for each of the functions which are capable of being provided by the MFP 10.

The information item "name of an application program" indicates a name of the application program necessary for the portable information terminal 20 to use the function of the MFP 10. The information item "ID" indicates ID of the application program that specifies or identifies the application program in correspondence with the name of the application program. The information items "name of application program" and "ID" of the application program shown in FIG. 5 correspond to the information items "name of application program" and "ID" of the application program shown in FIG. 4, respectively.

The information item "version" indicates a version of the application program specified by the name (or the ID) of the application program. For example, for the application program whose name is "scan app 001", only a version "1.00" exists. Further, for the application program whose name is "customize app A", versions "1.00" and "1.02" exist. Here, the version "1.02" is the latest version, as the larger the number of the version, the later the version becomes, in general.

The information item "kind/version of OS" indicates a kind and a version of the OS for the portable information terminal 20. The information item "kind/version of OS" is provided for considering the adaptability of the application program to the portable information terminal 20 when installing the application program. Thus, the information item "kind/version of OS" is used for selecting an appropriate application program based on the kind of and the version of the OS of the portable information terminal 20.

The information item "size of display" indicates size of display for the portable information terminal 20. The information item "size of display" is also provided for considering the adaptability of the application program to the portable information terminal 20 when installing the application program. Thus, the information item "size of display" is used for selecting an appropriate application program based on the size of the display of the portable information terminal 20.

The information item "performance" indicates performance for the portable information terminal 20. The information item "performance" is also provided for considering the adaptability of the application program to the portable information terminal 20 when installing the application program. Thus, the information item "performance" is used for selecting an appropriate application program based on the performance of the portable information terminal 20.

The information item "application program" indicates the application program itself. For example, as shown in the first line of the application program list of FIG. 5, the application program is "¥server/S001/app_1.00_xOS 1.x_s_s.exe" which is the version 1.00 of the "scan app 001" and applicable to the portable information terminal 20 whose kind/version of OS is "xOS 1.x", size of display is "standard" and performance is "standard". It means that plural kinds of application programs may be prepared for each of the names of the application programs to correspond to plural versions, plural device information sets for the portable information terminal 20, or the like. Therefore, the application program itself can be determined based on parameters such as the version, the device information or the like.

Although the application program list is previously stored in the application program storing unit 301 of the application delivering server 30 as described above, the application program list may be updated in accordance with adding of new application programs or new versions of the previously stored application programs.

First Example

Figure 6:
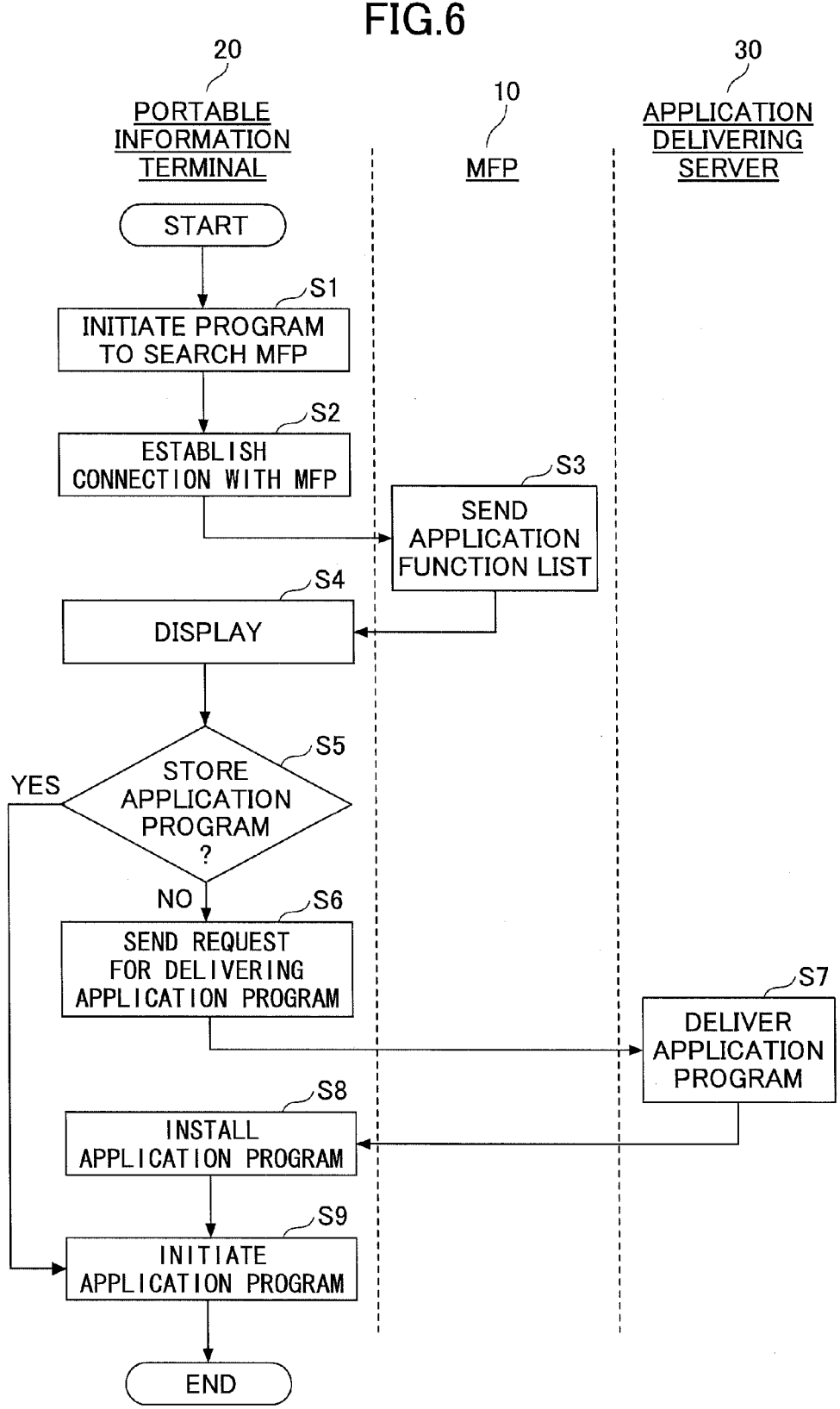
FIG. 6 is a flowchart showing an example of an operation of the application delivering system.

A first example of an operation of the application delivering system 100 is explained in the following. FIG. 6 is a flowchart showing an example of an operation between the MFP 10, the portable information terminal 20, and the application delivering server 30 for delivering an application program.

First, upon an operation by a user, the portable information terminal 20 initiates a program, which is previously installed in the portable information terminal 20, to search for a MFP connected to the LAN 50 under a condition that the portable information terminal 20 is connected to the LAN 50 (S1).

The portable information terminal 20 establishes a connection with the MFP found to be connected to the LAN 50 by the initiated program (S2). It is assumed that the MFP 10 is found and the connection between the portable information terminal 20 and the MFP 10 is established. This connection may be a kind of a connection where the MFP 10 recognizes the portable information terminal 20 (an address or the like) as it is just a trigger for the MFP 10 to send the application function list to the portable information terminal 20 in S3.

In S3, the list information supplying unit 102 of the MFP 10 sends device information (device name, address or the like) of the MFP 10 and the application function list of the MFP 10 to the portable information terminal 20.

Then, the list information obtaining unit 202 of the portable information terminal 20 obtains the device information of the MFP 10 and the application function list of the MFP 10. Subsequently, the display unit 203 of the portable information terminal 20 displays the application function list on the display panel of the portable information terminal 20 (S4).

Figure 7:
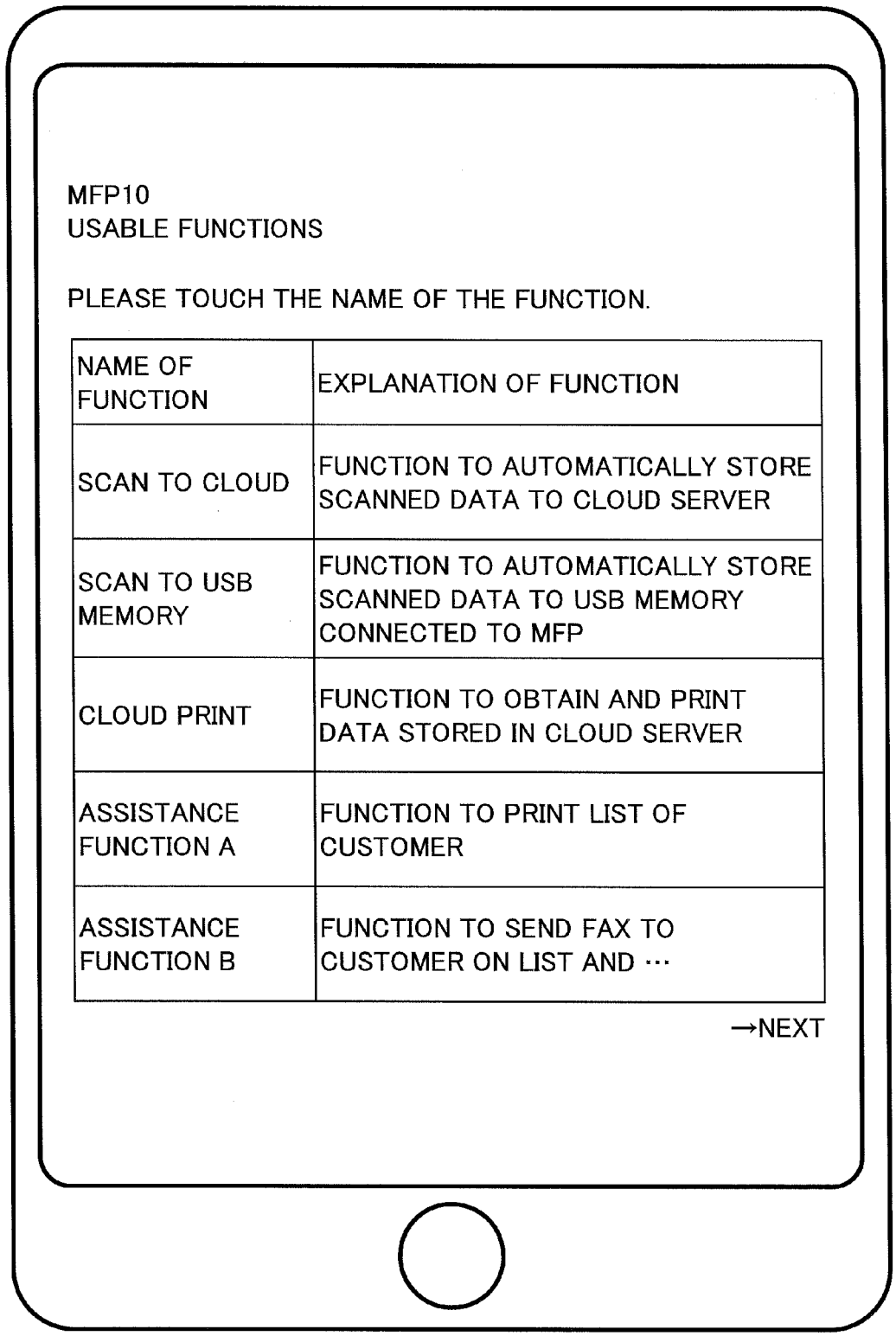
FIG. 7 is a view showing an example of an image displayed on a display panel of a portable information terminal.

FIG. 7 is a view showing an example of an image displayed on the display panel of the portable information terminal 20. In this example, the device information of the MFP 10 (the name of the MFP 10 in this example), and the "name of a function" and the "explanation of a function" among the information items of the application function list of the MFP 10 are displayed on the display panel of the portable information terminal 20. Thus, the user of the portable information terminal 20 can visually recognize the list information of the MFP 10.

When the user selects a desired function (a name of the function) by touching the display panel of the portable information terminal 20 or the like, the determination unit 204 of the portable information terminal 20 determines whether the portable information terminal 20 already stores the application program specified by the ID in correspondence with the selected name of the function (S5). In other words, the determination unit 204 determines whether the application program capable of using the function of the MFP 10 desired by the user is already installed in the application program storing unit 201 of the portable information terminal 20.

Here, it is assumed that "scan to cloud" shown in FIG. 7 is touched to be selected. At this time, when "scan to cloud" is selected, the determination unit 204 of the portable information terminal 20 obtains the "scan app 001" which is the name of the application program (or "S001" which is the ID of the application program) which is in correspondence with the selected name of the function "scan to cloud" from the application function list. Then, the determination unit 204 determines whether the application program having the same name (or the same ID) is stored in the application program storing unit 201 of the portable information terminal 20.

Here, it is also assumed that the portable information terminal 20 does not store the application program named "scan app 001". At this time, the determination unit 204 determines that the application program is not stored in the application program storing unit 201 of the portable information terminal 20 (NO in S5).

Then, the delivery requesting unit 205 of the portable information terminal 20 sends a request to the application delivering server 30 for delivering the application program (S6). The request includes the ID of the application program and the device information (kind of OS, version of OS, size of display, performance or the like) of the portable information terminal 20. In other words, the delivery requesting unit 205 of the portable information terminal 20 requests delivery of the application program necessary for using the function of the MFP 10 desired by the user.

Here, as assumed above, the delivery requesting unit 205 requests delivery of the application program named "scan app 001". The request sent to the application delivering server 30 includes "scan app 001" as the name of the application program (or "S001" as the ID of the application program). Further, it is assumed that the request sent to the application delivering server 30 includes "xOS" as the kind of OS, "1.x" as the version of OS, "standard" as the size of display, and "standard" as the performance, as the device information of the portable information terminal 20.

Further, it is necessary for the portable information terminal 20 to recognize the address (an IP address on the WAN 60, for example) of the application delivering server 30 when sending the request for delivering the application program. The address of the application delivering server 30 may be previously stored in the portable information terminal 20, or may be included in the application function list.

The delivery request receiving unit 302 of the application delivering server 30 receives the request for delivering the application program from the portable information terminal 20. Then, the application delivering unit 303 of the application delivering server 30 delivers the corresponding application program to the portable information terminal 20 (S7).

Specifically, the application delivering unit 303 refers to the application program list stored in the application programs storing unit 301 and determines the application program applicable to the portable information terminal 20 based on the name of the application program (or the ID of the application program), the device information (kind of OS, version of OS, size of display, performance or the like) of the portable information terminal 20 and the application program list.

Here, as assumed above, the delivery request receiving unit 302 receives the request including "scan app 001" as the name of the application program (or "S001" as the ID of application program) and the device information ("xOS" as the kind of OS, "1.x" as the version of OS, "standard" as the size of display, and "standard" as the performance) of the portable information terminal 20. Referring to the application program list shown in FIG. 5, the application program that meets this condition is "¥server/S001/app_1.00_xOS 1.x_s_s.exe" shown in the first line. Thus, the delivery request receiving unit 302 determines "¥server/S001/app_1.00_xOS 1.x_s_s.exe" as the application program applicable to the portable information terminal 20, and delivers this application program to the portable information terminal 20.

Here, for the application program having plural versions, the delivery request receiving unit 302 determines to deliver the latest version of the application program. For the application program named "scan app 001", as only version "1.00" exists, the delivery request receiving unit 302 determines to deliver the application program of version "1.00". However, for example, for the application program named "customize app A", as versions "1.00" and "1.02" exist, the delivery request receiving unit 302 determines to deliver the application program of the latest version "1.02" when not otherwise instructed.

In the portable information terminal 20, when the installing unit 206 receives the application program delivered from the application delivering server 30, the installing unit 206 installs the application program (S8). For example, the installing unit 206 installs the application program "¥server/S001/app_1.00_xOS 1.x_s_s.exe". Then, it becomes possible for the portable information terminal 20 to use the desired function of the MFP 10.

Thereafter, the portable information terminal 20 initiates the application program, connects to the MFP 10 and uses the function by the application program (S9). Specifically, after this operation, the application program named "scan app 001" is installed in the portable information terminal 20, and thus the portable information terminal 20 is able to initiate the application program, connect to the MFP 10, and use the function of "scan to cloud". Thus, the user of the portable information terminal 20 can use the function of the MFP 10 to automatically store data scanned by the MFP 10 in a cloud server via a wireless LAN in remote access using the portable information terminal 20.

On the other hand, when it is determined that the application program is already stored in the application program storing unit 201 of the portable information terminal 20 (YES in S5), the process proceeds to S9.

As described above, according to the application delivering system 100, even when the portable information terminal 20 does not include the application program capable of using the desired function of the MFP 10, it is possible to obtain the application program by a simple operation such as selecting the desired function from the image displayed on the display panel. Thus, the desired function of the MFP 10 can be used by the application program. Further, as the application program is delivered from the application delivering server 30, different from the MFP 10, it is necessary for the MFP 10 to store only the application function list. Thus, according to the application delivering system 100 of the embodiment, it is possible to deliver the application program necessary for using the function of the MFP 10 desired by the user to the portable information terminal 20 with a simple operation while reducing use of storage resources of the MFP 10.

Alternative Example

An alternative example is explained. In S5 of the flowchart shown in FIG. 6, the determination unit 204 of the portable information terminal 20 determines whether the application program capable of using the function desired by the user is stored in the application program storing unit 201. In this alternative example, at the portable information terminal 20, even when the application program itself is stored, if the version of the stored application program is not the latest one, the application program of the latest version is to be downloaded. In this alternative example, only an operation of S5 to S7 of the flowchart shown in FIG. 6 is explained as the rest of the operation is the same as the first example as explained above.

In this example, it is assumed that the "assistance function A" shown in FIG. 7 is touched to be selected. At this time, when "assistance function A" is selected, the determination unit 204 of the portable information terminal 20 obtains "customize app A" which is the name of the application program (or "C001" which is the ID of the application program) and "1.02" which indicates the latest version, which is in correspondence with the selected name of the function "assistance function A" from the application function list. Then, the determination unit 204 determines whether the application program having the same name (or the same ID) and whose version is equal to or newer than "1.02" is stored in the application program storing unit 201 of the information terminal 20.

Here, it is also assumed that the application program named "customize app A" whose version is 1.00 is stored in the portable information terminal 20. At this time, the determination unit 204 determines that the application program whose version is equal to or newer than "1.02" is not stored in the portable information terminal 20 (NO in S5).

Then, the delivery requesting unit 205 of the portable information terminal 20 sends the request for delivering the application program to the application delivering server 30 (S6). The request includes the ID of the application program and the device information (kind of OS, version of OS, size of display, performance or the like) of the portable information terminal 20. Specifically, the request sent to the application delivering server 30 includes "customize app A" as the name of the application program (or "C001" as the ID of the application program). Further, the request sent to the application delivering server 30 includes "xOS" as the kind of OS, "1.x" as the version of OS, "standard" as the size of display, and "standard" as the performance, as the device information of the portable information terminal 20.

The delivery request receiving unit 302 of the application delivering server 30 receives the request including "customize app A" as the name of application program (or "C001" as the ID of application program) and the device information ("xOS" as the kind of OS, "2.x" as the version of OS, "standard" as the size of display, and "standard" as the performance) from the portable information terminal 20 in S7. Referring to the application program list shown in FIG. 5, the application program that meets this condition is "¥server/C001/app_1.02_xOS 2.x_s_s.exe". Thus, the delivery request receiving unit 302 determines "¥server/C001/app_

1.02_xOS 2.x_s_s.exe" as the application program applicable to the portable information terminal 20, and delivers this application program to the portable information terminal 20. As described above, the delivery request receiving unit 302 determines to deliver the latest version of the application program. Thus, for the application program named "customize app A", as versions "1.00" and "1.02" exist, the delivery request receiving unit 302 determines to deliver the application program of the latest version "1.02" when not otherwise instructed.

In this example, although the application program named "customize app A" (version 1.00) itself is installed in the portable information terminal 20, the version of the application program is not the latest one. In such a case, the portable information terminal 20 can obtain the latest version of the application program named "customize app A" (version 1.02) from the application delivering server 30.

Second Example

Figure 8:
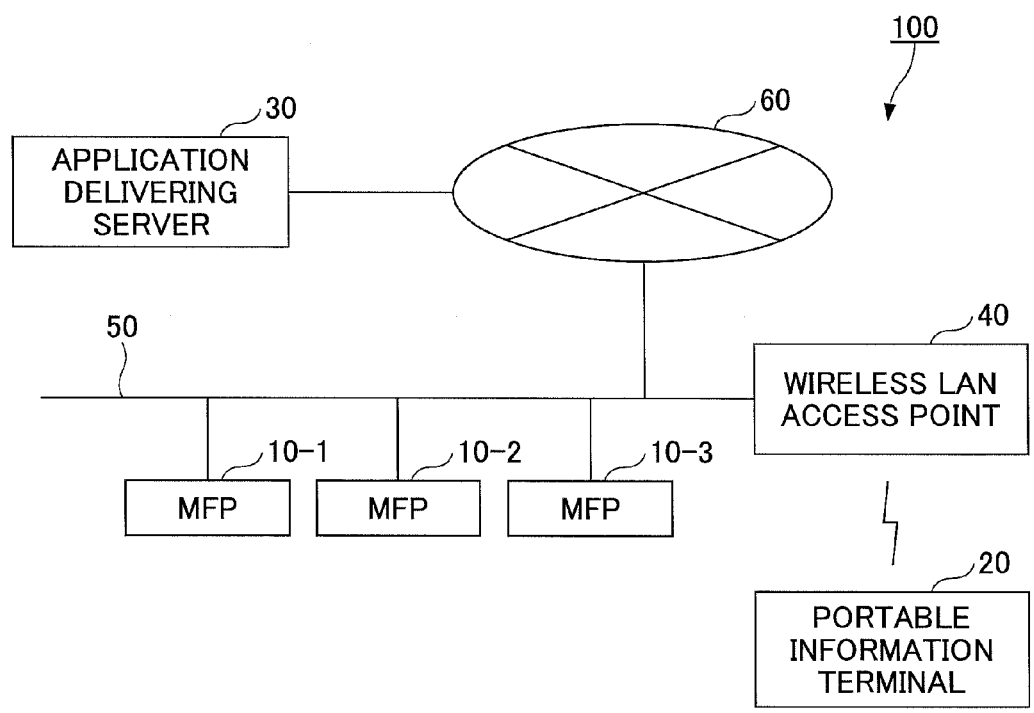
FIG. 8 is a block diagram showing another example of a network structure of an application delivering system of an embodiment.
Figure 9:
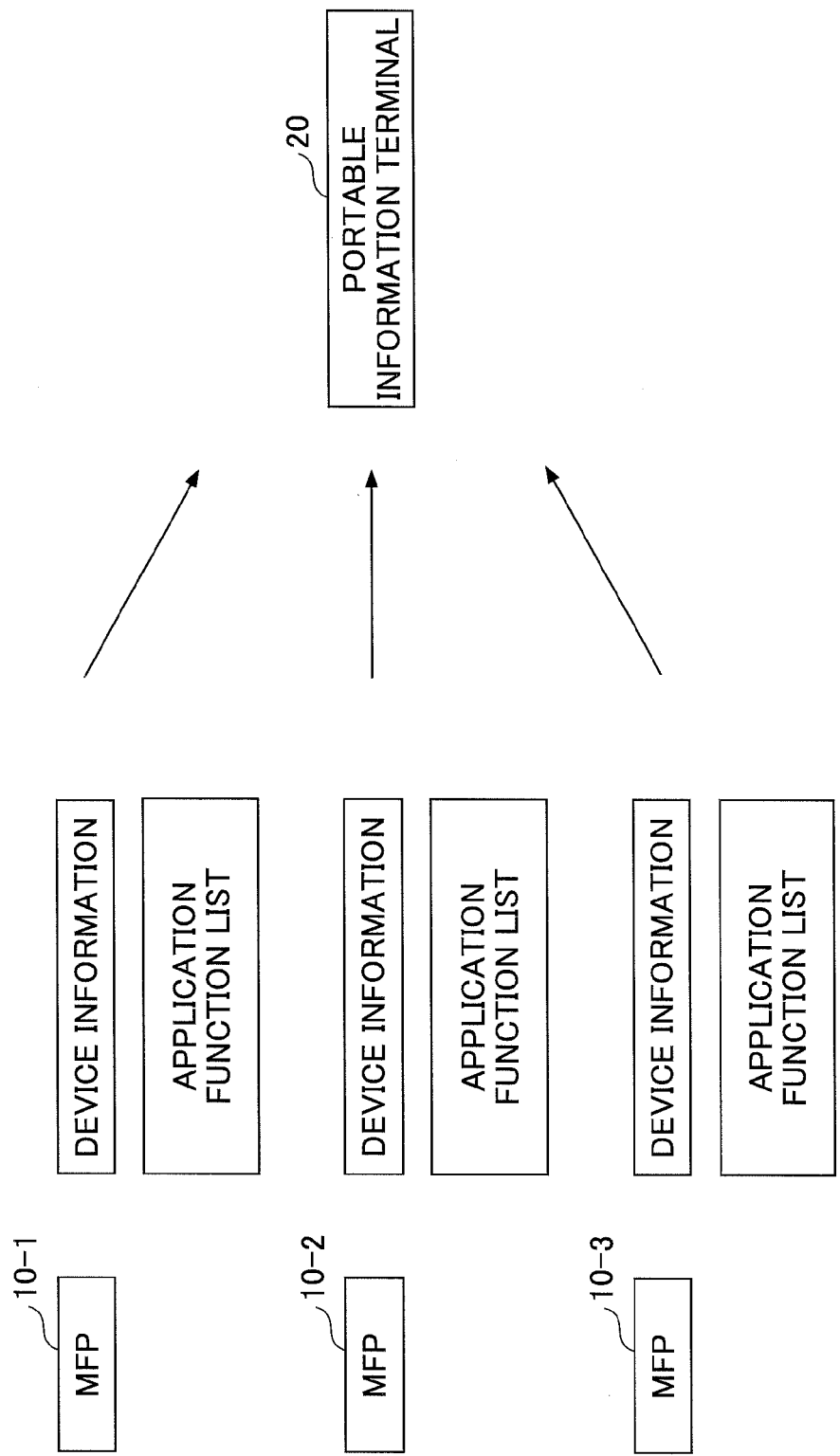
FIG. 9 is a view showing operations of plural MFPs.

A second example of operation of the application delivering system 100 is explained in the following. FIG. 8 is a block diagram showing an example of a network structure of the application delivering system 100 of the second example. FIG. 9 is a view showing operations of plural MFPs sending device information and application function lists.

In the first example explained above, a case where only one MFP 10 is connected to the LAN 50 is explained. However, in this example, it is assumed that plural MFPs 10 (a MFP 10-1, a MFP 10-2, a MFP 10-3 and the like) are connected to the LAN 50 as shown in FIG. 8. The operation of the application delivering system 100 of the example is explained with reference to S1 to S4 of the flowchart shown in FIG. 6.

Similar to the first example, upon an operation by a user, the portable information terminal 20 initiates a program, which is previously installed in the portable information terminal 20, to search for MFPs connected to the LAN 50 under a condition that the portable information terminal 20 is connected to the LAN 50 (S1).

The portable information terminal 20 establishes connections with the MFPs found to be connected to the LAN 50 by the initiated program (S2). It is assumed that three MFPs, the MFP 10-1, the MFP 10-2 and the MFP 10-3 are found and the connections between the portable information terminal 20 and the MFP 10-1, the MFP 10-2 and the MFP 10-3, respectively are established.

In S3, the list information supplying unit 102 of each of the MFPs 10 sends the device information (device name, address or the like, for example) and the application function list of the respective MFP 10 to the portable information terminal 20. Here, as the three MFPs, the MFP 10-1, the MFP 10-2 and the MFP 10-3, are found, as shown in FIG. 9, each of the MFP 10-1, MFP 10-2 and MFP 10-3 sends the device information and the application function list of the respective MFP. Further, in this embodiment, each of the MFP 10-1, the MFP 10-2 and the MFP 10-3 sends information of a place where the respective MFP is placed as the device information in addition to the device name and address.

Then, the list information obtaining unit 202 of the portable information terminal 20 obtains the device information and the application function lists from the MFP 10-1, the MFP 10-2 and the MFP 10-3, respectively. Subsequently, the display unit 203 of the portable information terminal 20 displays an image for selecting the MFP among the plural MFPs, the MFP 10-1, the MFP 10-2 and the MFP 10-3 to be used (S4).

Figure 10:
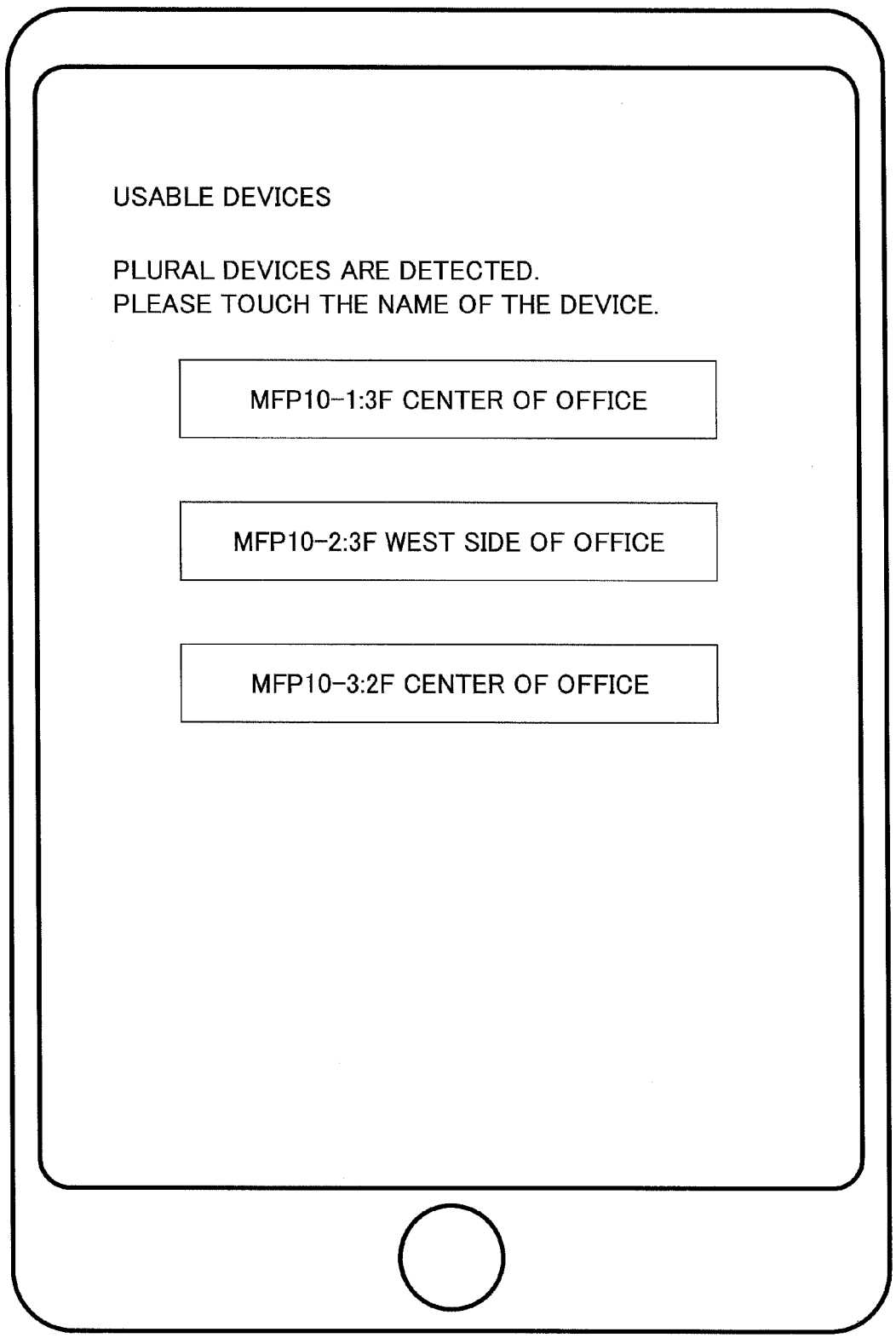
FIG. 10 is a view showing an example of an image displayed on a display panel of the portable information terminal.

FIG. 10 is a view showing an example of an image displayed on the display panel of the portable information terminal 20. In this example, the "name of MFP" and the "information of place" among the information items of the device information are displayed on the display panel of the portable information terminal 20. Thus, the user of the portable information terminal 20 can select the MFP to be used by touching the display panel of the portable information terminal 20 or the like. Here, it is assumed that the user selects "MFP 10-1: 3F center of office".

FIG. 11 is a view showing an example of an image displayed on the display panel of the portable information terminal 20. In this example, the device information of the MFP 10 ("name of MFP" and "information of place"), and the "name of function" and the "explanation of function" among the information items of the application function list of the MFP 10-1, are displayed on the display panel of the portable information terminal 20. Thus, the user of the portable information terminal 20 can visually recognize the list information of the MFP 10-1.

As described above, when plural MFPs are connected to the LAN 50, the portable information terminal 20 can connect to the desired MFP. In the second example, when the plural MFPs are found, the list of the MFPs is displayed on the display panel of the portable information terminal 20. In the image displayed on the display panel of the portable information terminal 20, not only the "name of MFP" but also the "information of place" is displayed so that the user can select the most usable MFP based on the position of the user and the places where the MFPs are placed.

After S4 of the flowchart shown in FIG. 6, the same operation explained in the first example is performed.

Alternative Example

An alternative example for the case where the plural MFPs are connected to the LAN 50 is explained. In this example as well, it is assumed that three MFPs, the MFP 10-1, the MFP 10-2 and the MFP 10-3, are connected to the LAN 50 as shown in FIG. 8. The operation of the application delivering system 100 of the example is explained with reference to S1 to S4 of the flowchart shown in FIG. 6.

Similar to the example as described above, upon an operation by a user, the portable information terminal 20 initiates a program, which is previously installed in the portable information terminal 20, to search for MFPs connected to the LAN 50 under a condition that the portable information terminal 20 is connected to the LAN 50 (S1).

The portable information terminal 20 establishes connections with the MFPs found to be connected to the LAN 50 by the initiated program (S2). It is assumed that three MFPs, the MFP 10-1, the MFP 10-2 and the MFP 10-3 are found and the connections between the portable information terminal 20 and the MFP 10-1, the MFP 10-2 and the MFP 10-3, respectively, are established.

In S3, the list information supplying unit 102 of each of the MFPs 10 sends the device information (device name, address or the like, for example) and the application function list of the respective MFP 10 to the portable information terminal 20. Here, as the three MFPs, the MFP 10-1, the MFP 10-2 and the MFP 10-3, are found, as shown in FIG. 9, each of the MFP 10-1, MFP 10-2 and MFP 10-3 sends the device information and the application function list of the respective MFP. Further, in this embodiment, each of the MFP 10-1, the MFP 10-2 and the MFP 10-3 sends information of a place where the respective MFP is placed as the device information in addition to the device name and address.

Then, the list information obtaining unit 202 of the portable information terminal 20 obtains the device information and the application function lists from the MFP 10-1, the MFP 10-2 and the MFP 10-3, respectively. Subsequently, the display unit 203 of the portable information terminal 20 displays a list including the functions which are capable of being provided by the MFP 10-1, the MFP 10-2 and the MFP 10-3 (S4). It means that the functions displayed by the display unit 203 of the portable information terminal 20 are the total of the functions capable of being provided by at least one of the MFP 10-1, the MFP 10-2 and the MFP 10-3.

Figure 12:
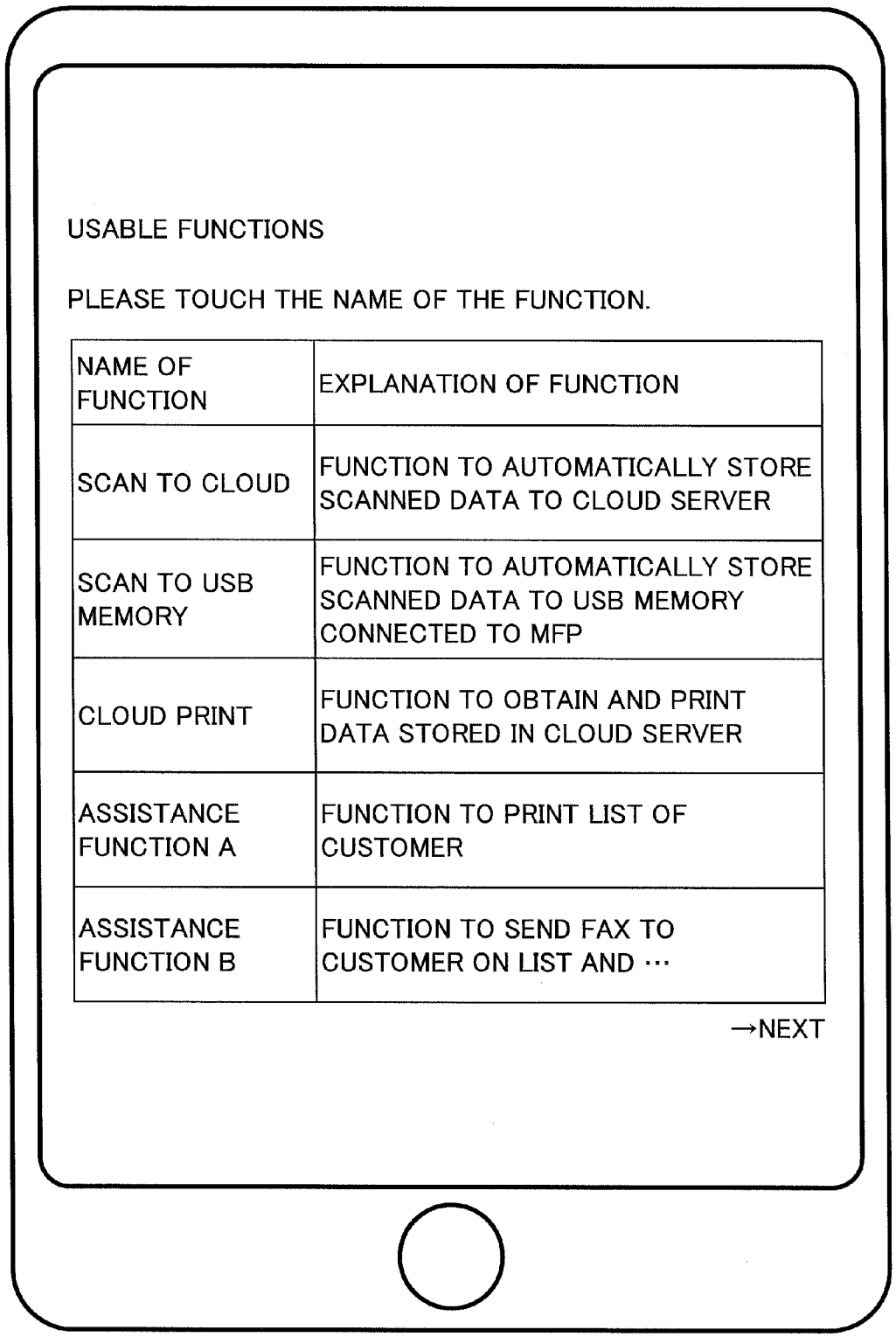
FIG. 12 is a view showing an example of an image displayed on a display panel of the portable information terminal.

FIG. 12 is a view showing an example of an image displayed on the display panel of the portable information terminal 20. In this example, the "name of a function" and the "explanation of a function" of the functions capable of being provided by at least one of the MFP 10-1, the MFP 10-2 and the MFP 10-3 are displayed on the display panel of the portable information terminal 20. Thus, the user of the portable information terminal 20 can visually recognize the list information of functions which are capable of being provided by at least one of the MFP 10-1, the MFP 10-2 and the MFP 10-3.

Here, it is assumed that "scan to cloud" shown in FIG. 12 is touched to be selected. When "scan to cloud" is selected, the display unit 203 of the portable information terminal 20 displays a list of the devices which are capable of providing the selected function "scan to cloud" as shown in FIG. 13.

Figure 13:
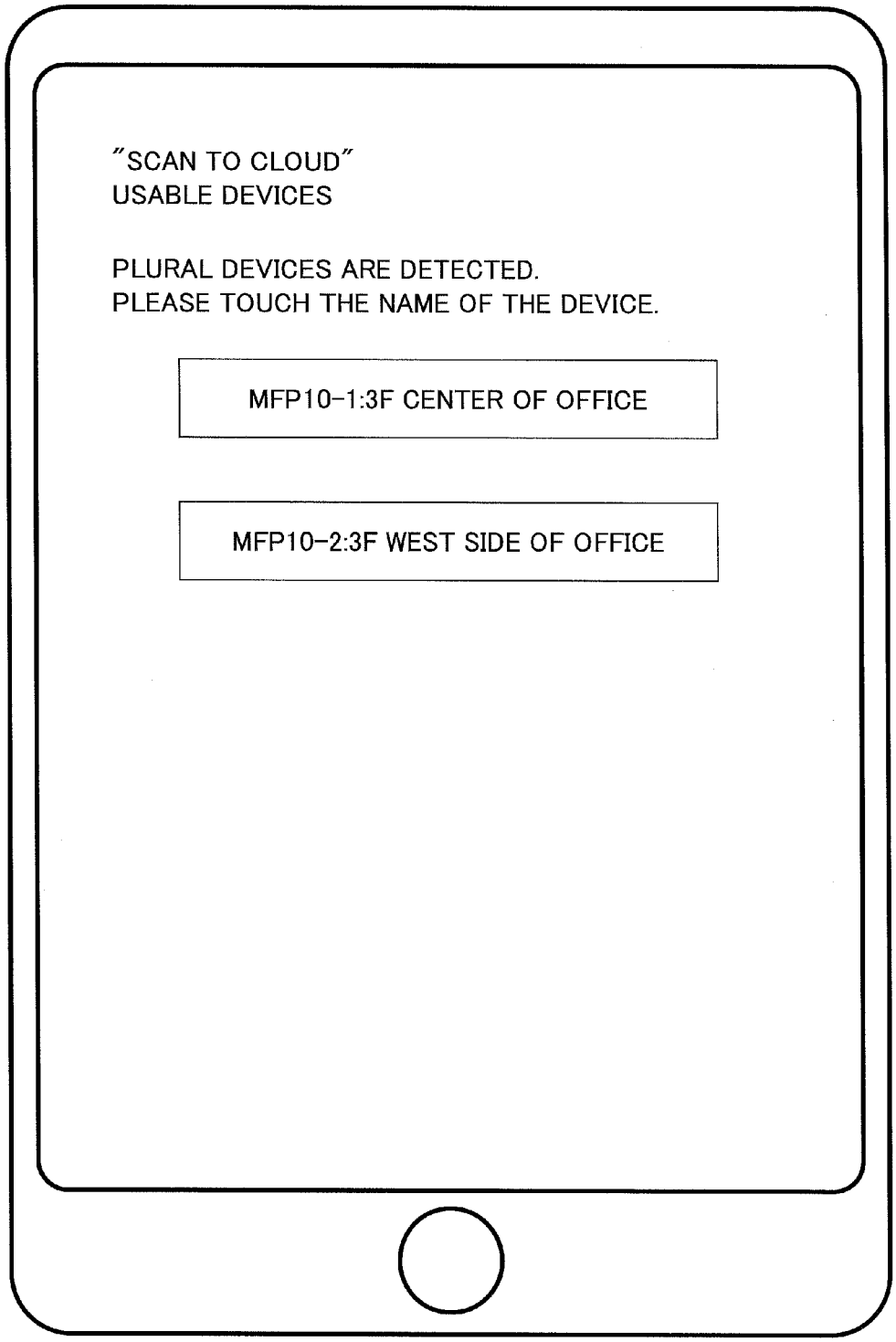
FIG. 13 is a view showing an example of an image displayed on a display panel of the portable information terminal.

FIG. 13 is a view showing an example of an image displayed on the display panel of the portable information terminal 20. When "scan to cloud" in the display panel shown in FIG. 12 is selected, the MFPs capable of providing the function "scan to cloud", among the MFPs connected to the LAN 50, are displayed on the display panel. For example, as shown in FIG. 13, "MFP 10-1: 3F center of office" and "MFP 10-2: 3F west side of office" are displayed when the MFP 10-1 and the MFP 10-2 are capable of providing the function named "scan to cloud". Then, the user of the portable information terminal 20 can select the MFP to be used from the displayed MFPs by touching the display panel of the portable information terminal 20 or the like.

As described above, when the plural MFPs are connected to the LAN 50, the portable information terminal 20 can connect to the desired MFP. However, in such a case, the user of the portable information terminal 20 may not know which of the MFPs can provide a desired function. Thus, in this example, all of the functions capable of being provided by at least one of the MFPs are displayed for the user. Then, when the user selects a desired function from the all of the functions, the MFPs capable of providing the function are displayed for the user. Thus, the user can select the most usable MFP based on the position of the user and the places where the MFPs are placed. With this embodiment, even when the user does not know which of the MFPs can provide a desired function, the MFPs capable of providing the desired function are shown to the user. Then, the user can select the most usable MFP from the shown MFPs.

After S4 of the flowchart shown in FIG. 6, the same operation explained in the first example is performed.

As described above, according to the embodiment, it is possible to provide an application delivering system 100 capable of delivering to a portable information terminal 20 an application program necessary for using a function of a MFP 10 desired by a user with a simple operation while reducing the use of storage resources of the MFP 10.

The individual constituents of the application delivering system 100 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

According to the embodiment, an application delivering system capable of delivering to a portable information terminal an application program necessary for performing a function of an image forming apparatus desired by a user with a simple operation while reducing the use of storage resources of the image forming apparatus is provided.

Although a preferred embodiment of the application delivering system has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

The present application is based on Japanese Priority Application No. 2011-163380 filed on Jul. 26, 2011, the entire contents of which are hereby incorporated herein by reference.

What is claimed is:

1. An application delivering system comprising:
an image forming apparatus;
an information terminal configured to operate the image forming apparatus; and
an application delivering server configured to deliver an application program for operating the image forming apparatus to the information terminal, the information terminal being capable of connecting to the image forming apparatus and the application delivering server via a network,
wherein the image forming apparatus includes
a list information storing unit that stores list information including plural sets of information, each of the sets of information including an item indicating a function capable of being provided by the image forming apparatus, and identification data of the application program which is necessary for the information terminal to use the function in correspondence with the item indicating the function, and
a list information supplying unit that supplies the list information to the information terminal,
wherein the information terminal includes
a list information obtaining unit that obtains the list information from the image forming apparatus,
a determination unit that determines whether it is necessary to obtain the application program necessary for the information terminal to use the function of the image forming apparatus selected by a user among the functions indicated by the items included in the list information, and
a delivery requesting unit that sends a request for delivering the application program including identification data of the application program to the application delivering server when the determination unit determines it is necessary to obtain the application program, and
wherein the application delivering server includes
an application program storing unit that stores application programs in correspondence with identification data,
a delivery request receiving unit that receives the request for delivering the application program from the information terminal, and an application program delivering unit that delivers the application program identified by the identification data included in the request for delivering the application program, to the information terminal.

2. The application delivering system according to claim 1, wherein the request for delivering the application program sent by the delivery requesting unit of the information terminal further includes device information of the information terminal, the application programs stored in the application program storing unit of the application delivering server are further in correspondence with device information of applicable devices, and the application program delivering unit of the application delivering server delivers the application program identified by the identification data and applicable to the information terminal based on the identification data and the device information of the information terminal included in the request for delivering the application program.

3. The application delivering system according to claim 1, wherein the information terminal further includes an application program storing unit that stores an application program in correspondence with identification data, and the determination unit determines whether it is necessary to obtain the application program by determining whether the application program is already stored in the application program storing unit of the information terminal based on the identification data.

4. The application delivering system according to claim 3, wherein each of the sets of information included in the list information includes an item indicating the latest version of the application program in correspondence with the identification data, the storing unit of the information terminal stores the application program in correspondence with an item indicating the version of the application program, and the determination unit of the information terminal determines whether it is necessary to obtain the application program by determining whether the application program of the latest version is already stored in the application program storing unit of the information terminal based on the item indicating the latest version of the application program included in the list information and the item indicating the version of the application program stored in the storing unit of the information terminal.

5. The application delivering system according to claim 1, wherein the information terminal is capable of connecting to plural of the image forming apparatuses via the network, and the list information obtaining unit of the information terminal obtains the list information from the plural image forming apparatuses, provides information indicating the plural image forming apparatuses and places where the plural image forming apparatuses are placed to the user, and further provides the list information obtained from the image forming apparatus selected by the user among the plural image forming apparatuses to the user.

6. The application delivering system according to claim 1, wherein the information terminal is capable of connecting to plural of the image forming apparatuses via the network, and the list information obtaining unit of the information terminal obtains the list information from the plural image forming apparatuses, provides information including all of the items indicating the functions capable of being provided by at least one of the image forming apparatuses to the user, and further provides information indicating one or more of the image forming apparatuses, capable of providing the function selected by the user, and places where the one or more of the image forming apparatuses are placed to the user.

7. The application delivering system according to claim 1, wherein the information terminal further includes a display unit that displays the information provided by the list information obtained from the image forming apparatus.

* * * * *